Feb. 25, 1941.  E. F. MARTINET  2,233,104
SELF-ALIGNING BEARING
Filed Sept. 10, 1938

Inventor
Eugene F. Martinet

Patented Feb. 25, 1941

2,233,104

UNITED STATES PATENT OFFICE 2,233,104

SELF-ALIGNING BEARING

Eugene F. Martinet, Cleveland, Ohio, assignor to The P. A. Geier Company, Cleveland, Ohio, a corporation of Ohio Application September 10, 1938, Serial No. 229,361

3 Claims. (Cl. 308—125)

The invention relates to self-aligning bearings, and more particularly to a self-aligning bearing construction for a motor shaft of an electrically operated, portable, domestic or household suction cleaner having a motor driven fan, a suction nozzle and a dust bag, manipulated by a handle; and the invention constitutes improvements upon the self-aligning bearing construction shown in the copending Martinet and Kasper application, Serial No. 25,272, matured in Patent No. 2,143,201.

Difficulties are encountered in constructing self-aligning bearings for the motor shaft of a suction cleaner in connection with the provision of proper lubrication of the same and in connection with providing the proper tension on the self-aligning elements of such a bearing.

These difficulties have been overcome in part by the self-aligning bearing construction disclosed in said application Serial No. 25,272 but the porous sponge-like bearing material used therein may leak on exposed surfaces thereof if fully saturated with oil maintained in the reservoir surrounding the same. Moreover, while the spring fingers utilized in such construction provide in a measure for the proper tension or pressure between the self-aligning elements of the bearing, the use of spring fingers increases the possibility of oil leakage from the porous bearing material.

And finally, while the spring fingers may be initially adjusted for the proper tension, continued use thereof results in the development of unequal tension resulting in uneven bearing operation.

Accordingly, it is an object of the present invention to provide a self-aligning bearing construction for a suction cleaner motor shaft including a porous metal bearing sleeve in which even spring tension may be established and maintained between the self-aligning elements of the bearing, and in which the porous bearing material may be supplied with an excessive amount of lubrication without lubrication leakage from the bearing.

Furthermore it is an object of the present invention to provide an improved self-aligning bearing construction for rotating shafts which may be excessively lubricated without danger of over-oiling or oil seepage.

Likewise, it is an object of the present invention to provide an improved self-aligning bearing construction for rotating shafts in which even tension or pressure may be maintained upon the self-aligning elements of the bearing.

Furthermore, it is an object of the present invention to provide a self-aligning bearing construction having relatively few parts of simple and inexpensive construction in manufacture, assembly and use.

And finally, it is an object of the present invention to provide a self-aligning bearing construction which avoids the described difficulties experienced in connection with the use of prior art self-aligning bearings and which incorporates one or more of the advantageous characteristics or desiderata set forth above.

These and other objects may be obtained by the self-aligning bearing constructions, arrangements, combinations, subcombinations, improvements, parts, elements and apparatus which comprise the present invention, the nature of which is set forth in the following general statement, a preferred embodiment of which together with its mode of construction and operation is set forth in the following description, and which is particularly and distinctly pointed out and set forth in the appended claims forming part hereof.

The nature of the improvements of the present invention may be described in general terms as preferably including in self-aligning bearing construction for a rotating shaft, a bearing plate or base provided with a stationary housing wall, a retaining flange secured to said bearing plate spaced from said housing wall, a movable housing wall intermediate said stationary housing wall and said retaining flange, an oil repellent and heat resistant rubber ring interposed between the retaining flange and the movable housing wall, a bearing sleeve of porous absorbent spring-like metallic bearing material mounted within said housing walls, a shaft journaled in said sleeve, the sleeve being provided with convex spherical surfaces, the housing walls being provided with concave spherical surfaces, the center of the curvature of said spherical surfaces lying on the axis of said shaft, preferably means preventing relative rotation between the fixed housing wall and the bearing sleeve on said shaft axis, said housing walls forming a compartment communicating with the exterior of the sleeve forming a lubricant reservoir, means for introducing free lubricant into said reservoir, preferably a felt packing within said reservoir, said rubber ring sealing said reservoir against leakage and providing a predetermined tension between said convex and concave spherical bearing aligning surfaces.

By way of example, an embodiment of the present improvements is illustrated in the accompanying drawing forming part hereof in which—

Similar numerals refer to similar parts throughout the various figures of the drawing.

Figures 1, 2, 3, 4:
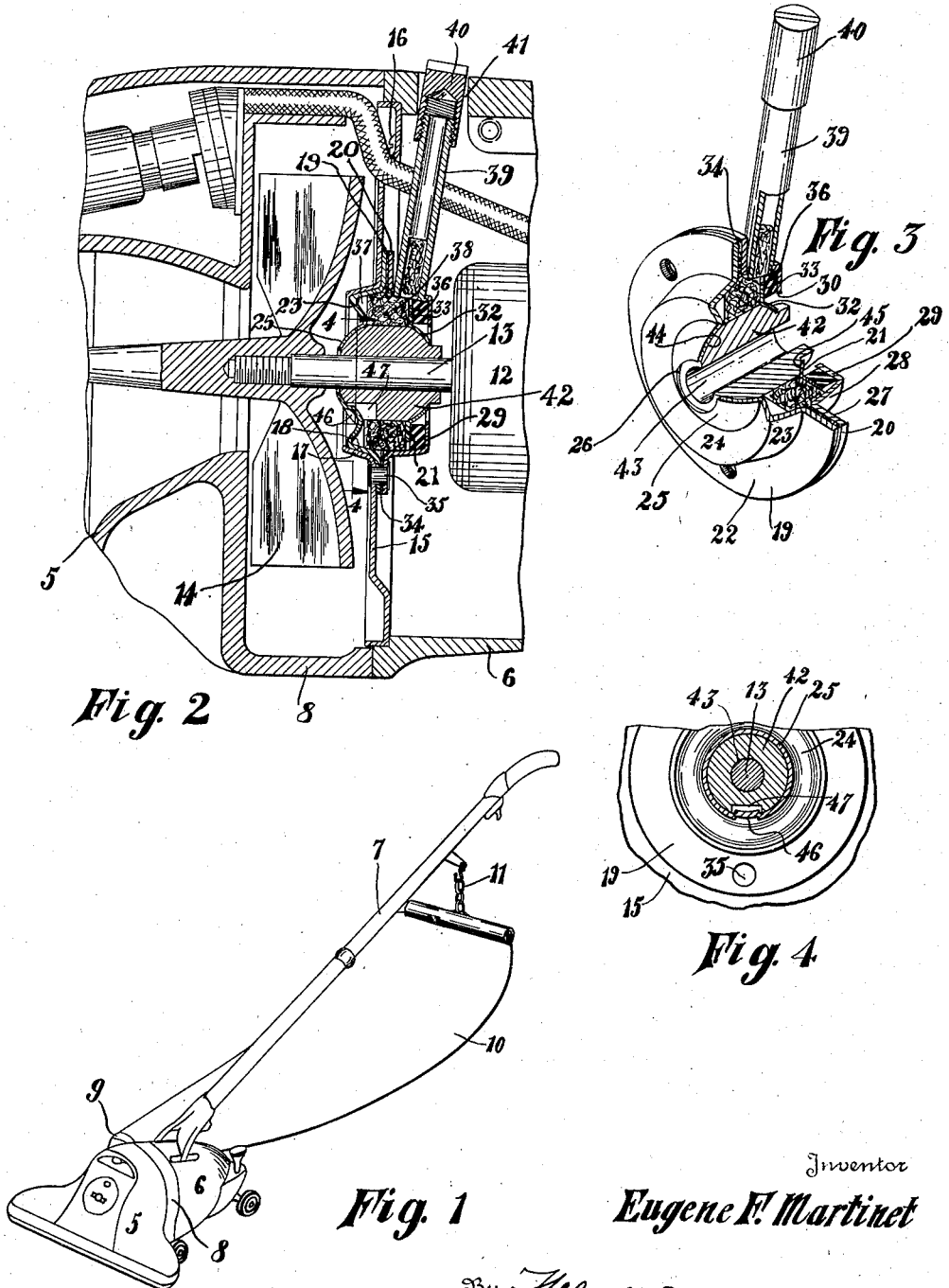
Figure 1 is a perspective view of a suction cleaner equipped with the improved self-aligning bearing construction.
Fig. 2 is an enlarged fragmentary vertical sectional view of certain portions of the suction cleaner shown in Fig. 1 showing one form of an improved self-aligning bearing construction.
Fig. 3 is a perspective view of certain of the improved bearing parts shown in Fig. 2.
Fig. 4 is a cross section taken on the line 4—4, Fig. 2.

In Figure 1, a usual type of suction cleaner is shown including a nozzle 5, a motor housing 6, an operating handle 7, and a fan housing 8, having an outlet member 9 to which a dust bag 10 is detachably connected, the dust bag 10 being supported by any usual means 11 from the handle 7.

Referring more particularly to Figs. 2, 3 and 4 wherein the improved self-aligning bearing construction is illustrated in detail, the motor 12 in motor housing 6 is provided with a shaft 13 on which fan 14 operating in fan housing 8 is mounted.

The improved self-aligning bearing construction forms a support for said shaft 13 and preferably includes a plate or base member 15, which is preferably mounted on and secured to the motor housing 6 by screws or the like 16 engaging in lugs or bosses formed on the motor housing.

The plate or base member 15 is provided centrally thereof with a short neck 17 preferably having an inner spherical surface 18. The base or plate member 15 is provided with a bearing housing preferably by utilizing a fixed housing wall member 19, a second fixed housing member 20 and a movable housing wall member 21. The housing wall member 19 may be formed integrally with member 15, although for convenience of manufacture and assembly the same may be a separate member as shown.

The member 19 preferably includes a flange portion 22, a preferably spherically formed wall portion 23 extending therefrom and fitting within neck 17, an inturned annular portion 24 and a spherically formed wall portion 25 surrounding the central aperture 26.

The fixed housing wall member 20 may include a flange portion 27, a preferably spherical wall portion 28 and an inturned retainer flange 29 surrounding a central aperture 30. The movable housing wall 21 preferably includes a spherically formed portion 32 terminating in the outturned flange portion 33 overlapped by the retainer flange 29.

In assembling the fixed and movable housing walls 19, 20 and 21 on plate 15, a paper gasket 34 is interposed between flange portions 22 and 27, and flange portions 22, 27 and paper gasket 34 are then secured by rivets or other suitable means 35 to the plate member 15.

When assembled, movable housing member 21 is interposed between fixed housing members 19 and 20; and a rubber ring 36 formed of a compound of rubber and neoprene or other synthetic material added to the rubber to make it oil repellent and heat proof, is interposed between retainer flange 29 and fixed housing member flange 33.

As shown in Figs. 2 and 3, the housing members form an annular compartment indicated at 37 which serves as a lubricant reservoir and in which may be located a felt or lubricant absorbent ring or washer 38. A short pipe 39 is preferably mounted on the housing member 20 enclosed by a screw cap 40 located in a convenient opening 41 in the motor housing 6, whereby the pipe 39 provides means for introducing free lubricant into the reservoir or compartment 37.

The bearing sleeve 42 formed of porous, absorbent, sponge-like, metallic bearing material, is universally journaled in said housing walls, the internal bore 43 of which sleeve journals the shaft 13. The sleeve 42 is provided with exterior convex spherical surfaces 44 and 45 which together with the spherical portions 25 and 32 have a center of curvature lying on the axis of shaft 13 whereby sleeve member 42 journals shaft 13 in a self-aligning manner.

Rubber is ordinarily deteriorated by continued contact with oil and grease so that if the rubber ring 36 were formed of an ordinary rubber composition, it would not satisfactorily discharge its dual duty of sealing the bearing against oil leakage and supplying the proper tension or pressure between the spherical surfaces of the self-aligning bearing.

However, the rubber ring 36 in being formed of a compound of rubber with neoprene or other synthetic material added to make it oil repellent and heat resistant, provides an effective lubricant seal and, in being clamped under pressure between flanges 29 and 33 when the housing wall is assembled, supplies the necessary even self-aligning bearing surface pressure for the bearing.

Referring more particularly to Fig. 4, spherical portion 25 of member 19 is preferably provided with a depression 46 fitting in recess 47 of sleeve 42 for preventing relative rotation between sleeve 42 and fixed housing walls 19 and 20 about the axis of shaft 13.

Although the improved self-aligning bearing construction has been shown as applied in a motor shaft of a suction cleaner between the fan and motor, it is to be understood that the improved construction may be utilized for journaling the other end of a motor shaft or for journaling other rotating shafts at other places in a suction cleaner construction, or in other devices where self-aligning bearings are desired.

Accordingly, the present invention provides an improved self-aligning bearing construction for rotating shafts which may be properly, uniformly and excessively lubricated with oil or other lubricant but without danger of over-oiling or oil seepage; and provides a construction in which an even tension is presented or maintained at all times between the self-aligning bearing parts.

Having now described the features of the invention, the construction, operation and use of a preferred form of the same, and the advantages of the results obtained by the use of the same, the new and useful parts, elements, combinations, constructions and devices, and reasonable mechanical equivalents obvious to those skilled in the art, are set forth in the appended claims.

I claim:

1. Self-aligning bearing construction including a fixed housing wall having a concave spherical surface, a fixed housing wall having a flange, a movable housing wall between the fixed housing walls and having a concave spherical surface and a flange, a lubricant repellent rubber ring clamped under compression between said flanges, and a porous metal bearing element having convex spherical surfaces journaled in said concave spherical surfaces under the pressure of said rubber ring.

2. Self-aligning bearing construction including opposed fixed housing walls and a movable housing wall between the opposed fixed housing walls, a porous metal bearing element universally journalled between one of the opposed fixed walls and the movable wall, said walls forming a lubricant containing compartment around said bearing element, and a lubricant repellent rubber ring interposed under compression between the movable wall and the other opposed fixed wall to seal the bearing against lubricant leakage and maintain intimate contact between the universal bearing element and its journalling walls.

3. Self-aligning bearing construction including opposed housing walls and a movable housing wall between the opposed housing walls, a porous metal bearing element universally journalled between one of the opposed walls and the movable wall, said walls forming a lubricant containing compartment around said bearing element, and a lubricant repellent rubber ring interposed between the movable wall and the other opposed wall, and means clamping the opposed walls together and applying compression on the lubricant repellant rubber ring and the movable wall against the universal bearing element and its journalling opposed wall.

EUGENE F. MARTINET.